Patented Aug. 14, 1928.

1,680,799

UNITED STATES PATENT OFFICE.

WALTER MINNICH, OF MONTREUX, SWITZERLAND, ASSIGNOR TO SOCIETY OF CHEMICAL INDUSTRY IN BASLE, OF BASEL, SWITZERLAND.

ESTERS OF UNSATURATED ACIDS.

No Drawing. Original application filed November 10, 1924, Serial No. 749,045, and in Switzerland November 19, 1923. Divided and this application filed February 3, 1928. Serial No. 251,753.

This application is a division of application Ser. No. 749,045, filed November 10, 1924.

The invention relates to the preparation of new esters of cholesterol with unsaturated organic acids.

I have found that highly therapeutically active esters of unsaturated acids can be obtained by esterifying acids of the general formula:

R.COOH wherein R stands for a low aliphatic hydrocarbon-radical carrying at least one double linkage.

By a low aliphatic hydrocarbon-radical I understand a radical containing less than ten atoms of carbon. As an example of such an acid there may be named crotonic acid.

Instead of the acids themselves also their derivatives, such as halides or anhydrides, may be condensed with cholesterol; on the other hand, instead of cholesterol itself, also its halides may be brought to reaction with the above named acids.

*Example.*—39 parts by weight of cholesterol and 11 parts of crotonic acid chloride are heated together in a reflux apparatus in an oil bath at 160° C. until there is no further evolution of hydrogen chloride. The reaction product is then recrystallized from 800 parts of boiling alcohol after addition of decolorizing charcoal. The pure ester forms a waxy crystalline powder. It begins to soften at 90° C., but does not melt to a clear liquid until 149° C. On cooling it shows a splendid play of color.

What I claim is:—

As new articles of manufacture useful in therapeutics the herein described esters of cholesterol with unsaturated acids of the general formula:

R.COOH wherein R stands for a low aliphatic hydrocarbon-radical carrying at least one double linkage.

In witness whereof I have hereunto signed my name this 19th day of January 1928.

WALTER MINNICH.